(Model.)
W. P. TARBELL.
CLAMP.
No. 386,279. Patented July 17, 1888.
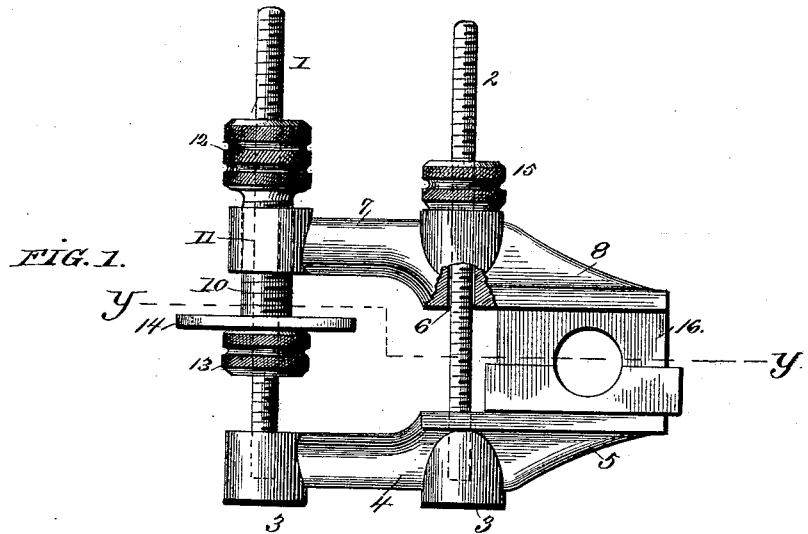
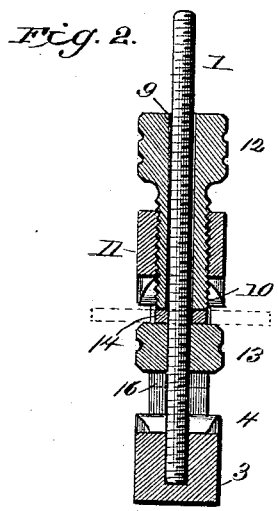
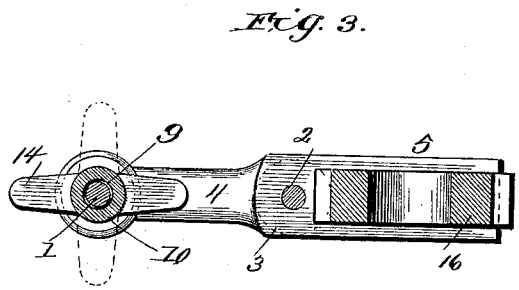
WITNESSES:
Jos. A. Ryan
Chas. R. Wright
INVENTOR,
W. P. Tarbell
BY Munn & Co.
ATTORNEYS,

United States Patent Office.

WENDELL P. TARBELL, OF MILFORD, NEW HAMPSHIRE.

CLAMP.

SPECIFICATION forming part of Letters Patent No. 386,279, dated July 17, 1888.

Application filed March 22, 1888. Serial No. 268,118. (Model.)

*To all whom it may concern:*

Be it known that I, WENDELL P. TARBELL, of Milford, in the county of Hillsborough and State of New Hampshire, have invented a new and Improved Clamp, of which the following is a full, clear, and exact description.

This invention relates to an improvement in clamps for holding pieces of metal or wood, and has for its object to provide a clamp so constructed that the clamping-jaws may be securely held in tightened position.

The invention will be set forth in the following description, and pointed out in the claims.

Reference is to be had to the annexed drawings, forming a part of this specification, in which similar figures of reference indicate corresponding parts in all the views.

Figure 1 illustrates the invention with an article clamped therein, a portion of the clamp being broken away. Fig. 2 is a vertical section on the line x x of Fig. 1, looking toward the end of the clamp; and Fig. 3 is a horizontal section of the device in Fig. 1 on the line y y.

In the construction of this invention I employ two screw-threaded rods, 1 2, having their lower ends screwed into socketed portions 3 3 on an arm, 4, of a fixed jaw, 5. The rod 2 projects freely through an opening, 6, in the arm 7 of the movable jaw 8, and the rod 1 freely passes through a perforation, 9, of the hollow screw 10, mounted in the screw-threaded socket-piece 11 of the arm 7, the hollow screw 10 being formed with an operating thumb-nut, 12.

Upon the screw-threaded rod 1 is mounted a thumb-nut, 13, and above it a lever, 14, the thumb-nut 13 and lever 14 being located between the socket-piece 3 and the lower end of the hollow screw 10. A thumb-nut, 15, is mounted on the screw-threaded rod 2 above the movable jaw 8. The screw 10 is formed with a thread of a different pitch from that on the rod 1, so that the screw 10 will travel faster than the nut 13, or the nut faster than the screw, according to which has the greater pitch, the screw 10 or rod 1 thereby giving a differential movement between it and the nut 13 and affording a greatly-increased leverage when the threads on screw 10 and rod 1 are properly proportioned.

By means of the foregoing device, when it is desired to clamp a piece of metal or wood, the nut 15 and the hollow screw 10 are moved toward the top of the screw-threaded rods 1 and 2, and the jaw 8 is then raised up a suitable distance to permit of the insertion of the article to be clamped. The article (as, for example, a block, 16,) being placed between the jaws 8 and 5, the nut 15 is first screwed down so as to press the jaw 8 against the block 16. The nut 13 is then run up, carrying the lever 14 with it up against the end of screw 10. The jaw 8 can now be further tightened by means of lever 14, which, being clamped between the screw 10 and the nut 13, will when turned turn both the screw 10 and nut 13, and thereby tighten the said jaw. The jaw can also be tightened by operating the screw 10 by means of the thumb-nut 12, which will cause the nut 13 to be turned by the frictional contact between it and the lever 14 and screw 10.

In unusual cases, where the lever would not be free to swing, it can be removed, and full power can be obtained by means of the differential movement, power being applied to thumb-nut 12 on screw 10, but generally, being loosely mounted, it will not interfere with operating the clamp, and can always be adjusted so as to stand parallel with the jaws when clamping any object. The lever 14, being loosely mounted on rod 1, can be easily removed when necessary—as, for example, when obstructions are such that it could not be swung clear round. When in place, the same leverage is obtained as if it were formed on the nut, and there are none of the disadvantages incident to its being formed on the nut.

It is obvious that the relative arrangement of the adjusting nuts and jaws may be varied to adapt the clamp for clamping different objects. The screw-threaded rods 1 and 2 may also be detached and longer rods employed. The rods 1 and 2 are easily removed and much longer ones quickly substituted for large work; or for very small work very short screw-rods can be substituted where projections from the jaws would be in the way. After the jaw 8 has been clamped into position by means of the clamping-nut 13, the action of screwing up the nut 13 and turning the lever-bar 14 forces the hollow screw 10 upward and with it the arm 7, thereby exerting a lever action upon the latter, causing it to tilt on the rod 2 and to still further force the movable jaw 8 against the object already secured between the jaws 8 and 5.

Having thus described my invention, I claim as new and desire to secure by Letters Patent—

1. A clamp constructed with a fixed jaw having an arm provided with screw-rods, and a movable jaw loosely mounted on one of the screw-rods, which is provided with a clamping-nut, and having an arm provided with a screw-threaded socket engaging a hollow screw loosely mounted on the other screw-rod having a thread different in pitch from the hollow screw through which the rod freely passes, a lever-bar loosely mounted on the latter adjacent to the hollow screw, and an adjusting and clamping thumb-nut also mounted on the same screw-rod adjacent to the lever-bar, substantially as described.

2. In a clamp constructed as herein described, a fixed jaw having an arm with detachable screw-rods, a movable jaw having an arm loosely mounted on one of the screw-rods, which is provided with a screw-threaded clamping-nut, a hollow screw loosely mounted on the other screw-rod and adjustable in the arm of the movable jaw, with a clamping-nut adjustable against the hollow screw, substantially as described.

3. A clamp consisting of the following parts, viz: a fixed jaw, 5, having an arm, 4, screw-threaded sockets 3 3, in which are located removable screw-rods 1 2, the movable jaw 8, having an arm, 7, provided with perforation 6, through which the screw-rod freely passes, a clamping-nut, 15, mounted on the rod 2, the adjustable hollow screw 10, mounted in the screw-threaded socket 11 of arm 7 and loosely mounted on the screw-rod 1, the lever 14, loosely mounted on rod 1 beneath screw 10, and the clamping-nut 13, screw-threaded on rod 1 beneath lever 14, substantially as described.

WENDELL P. TARBELL.

Witnesses:
 HAMILTON P. DARRACOTT,
 GEO. L. DARRACOTT.